(12) United States Patent
Cardarelli

(10) Patent No.: US 6,481,283 B1
(45) Date of Patent: Nov. 19, 2002

(54) CORIOLIS OSCILLATING GYROSCOPIC INSTRUMENT

(75) Inventor: Donato Cardarelli, Medfield, MA (US)

(73) Assignee: Milli Sensor Systems & Actuators, Inc., West Newton, MA (US)

( * ) Notice: Subject to any disclaimer, the term of this patent is extended or adjusted under 35 U.S.C. 154(b) by 0 days.

(21) Appl. No.: 09/542,605

(22) Filed: Apr. 4, 2000

Related U.S. Application Data

(60) Provisional application No. 60/127,721, filed on Apr. 5, 1999.

(51) Int. Cl.[7] .............................. G01P 15/14; G01P 9/02
(52) U.S. Cl. ............................... 73/504.02; 73/504.03; 73/510
(58) Field of Search ......................... 73/504.02, 504.03, 73/504.08, 504.09, 504.11, 510, 504.12, 504.18, 514.01; 74/5 R, 5.34

(56) References Cited

U.S. PATENT DOCUMENTS

| | | | | |
|---|---|---|---|---|
| 3,895,521 A | * | 7/1975 | Howard | 73/178 R |
| 4,125,017 A | * | 11/1978 | Dhuyvetter et al. | 73/178 R |
| 4,179,818 A | * | 12/1979 | Craig | 73/178 R |
| 4,315,693 A | * | 2/1982 | Walker | 73/514.27 |
| 4,601,206 A | * | 7/1986 | Watson | 73/510 |
| 5,301,114 A | * | 4/1994 | Mitchell | 73/178 R |
| 5,712,426 A | * | 1/1998 | Sapuppo et al. | 73/504.02 |

* cited by examiner

*Primary Examiner*—Helen Kwok
(74) *Attorney, Agent, or Firm*—Mirick, O'Connell, DeMallie & Lougee, LLP

(57) ABSTRACT

Disclosed is a Coriolis Oscillating Gyroscopic instrument, comprising: a Double Ended Tuning Fork (DETF) having two stems and two tines; a Torque Summing Member (TSM) rigidly coupled to the DETF stems; drives located at least partially on the TSM for vibrating the tines sinusoidally in opposition along a first axis, the tines' motion having a constant amplitude, a frequency and a phase; a case; a plurality of flexures connecting the TSM to the case, to allow the TSM and the DETF to rotationally oscillate together relative to the case about a second axis transverse to the first axis; and a sensor and associated instrumentation for resolving rotation of the TSM relative to the case.

34 Claims, 7 Drawing Sheets

CORIOLIS OSCILLATING GYROSCOPIC INSTRUMENT

CROSS-REFERENCE TO RELATED APPLICATION

This application claims priority of provisional application No. 60/127,721, filed on Apr. 5, 1999.

FIELD OF INVENTION

This invention relates to Coriolis oscillating gyroscopes (gyros) and Coriolis closed loop accelerometers based on tuning fork configurations. This invention also relates to gyros and accelerometers which are planar and can be fabricated using MEMS (Microelectromechanical Systems) technologies. This invention also relates to planar designs which can be combined to form full inertial measurement units in the plane.

BACKGROUND OF INVENTION

Coriolis double-ended tuning fork gyros are designed in planar form to take advantage of MEMS fabrication approaches. (See, for example, U.S. Pat. No. 5,349,855, the disclosure of which is incorporated herein by reference). They require oscillatory excitation of the tines which is done relative to the substrate. In response to rotation rate of the vehicle, the structure to which the tines are attached oscillates with an amplitude of oscillation proportional to the input rate. Presently the output motion is measured relative to the substrate. With both the driving and sensing functions being done relative to the substrate (or case), there is potential for mechanical and electrical coupling between the two members which can affect the performance.

Double-ended tuning fork gyros with the planar form do not have the capability to sense rotation about the axis normal to the plane. This planar configuration is necessary to allow a set of three planar gyros to sense rotation about the three orthogonal axes. A planar set of gyros allows the fabrication of a planar inertial measurement unit (IMU) when combined with a planar set of accelerometers.

Closed-loop, pendulous accelerometers based on the rebalance torque from tuning fork gyros have not been devised. The POGA (Pendulous Oscillating Gyro Accelerometer) concept disclosed in U.S. Pat. No. 5,457,993 (also incorporated by reference) needs to be extended for implementation with tuning fork gyros. In planar form these designs are complementary to the gyros above and can provide the planar accelerometers for the planar IMU.

SUMMARY OF THE INVENTION

It is therefore an object of this invention to devise tuning fork gyros with output gimbals to de-couple the drive of the tines from the sensing of the output motion by driving the tines relative to the gimbal and sensing the gimbal output motion relative to the case.

It is a further object of this invention to devise a planar tuning fork gyro with rotation rate sensitivity about the normal to the plane.

It is a further object of this invention to devise a closed loop, pendulous accelerometer with rebalance torque provided from a Coriolis gyro oscillated about its input axis.

It is a further object of this invention to devise planar, closed loop, pendulous accelerometers with rebalance provided by a Coriolis gyro oscillated about its input axis.

It is a further object of this invention to devise planar, closed loop, pendulous accelerometers with sensitivity about the three orthogonal axes.

It is a further object of this invention to devise planar gyros and accelerometers which can be combined in the plane to sense all six degrees of freedom.

The Coriolis Oscillating Gyro (COG) utilizes a double ended tuning fork (DETF) rotor that is attached rigidly to a gimbal called a torque summing member (TSM). The TSM is flexurally mounted to the case. The tines of the DETF are driven relative to the TSM. The TSM output motion is oscillatory and its motion is measured relative to the case. In this arrangement, the tine drive and output sensing are mechanically and electrically decoupled. The contribution to existing, DETF-based gyros is the addition of the gimbal.

The Coriolis Pendulous Oscillating Gyro Accelerometer (CPOGA) combines a pendulous accelerometer with a gyroscope. The pendulum rotates about its pendulous axis under the influence of acceleration input, and the gyro provides the rebalance torque to hold the pendulum at null; the accelerometer is operated closed loop. The principle is the same as used with the POGA.

The CPOGA is formed by adding a mass to the COG gimbal so as to make the gimbal pendulous. The CPOGA also requires that in addition to oscillation of the DETF tines, the COG is oscillated about its input axis by oscillating the gimbal. The interaction between the tines and gimbal oscillations generates the gyro torque. The gyro torque and pendulous torque both act on the gimbal and that is why the gimbal is referred to as the torque summing member.

For the gyro torque to be provided in the CPOGA, the preferred implementation is to maintain the tine oscillatory amplitude and TSM oscillatory amplitude constant. The frequency of oscillation for both needs to be the same. The gyro torque is generated by varying the phase between the oscillation of the tines and the oscillation of the gimbal. When the phase between them is 90° the gyro torque is zero.

The gimbal allows for the addition of pendulous mass without affecting the DETF dynamics.

One difference between the gyros in the POGA and those in the CPOGA is that the POGA gyros are based on a single rotor mass oscillating in angle whereas for the CPOGA, two rotor masses oscillate along a straight line in a double-ended tuning fork arrangement.

A second difference between the CPOGA and POGA is that the POGA is based on three axes and three members which rotate about them, whereas the CPOGA is based on two axes and two elements (the tine rotor and gimbal) and the tines move along the first axis and the gimbal rotates about the second.

Planar designs of both the COG and CPOGA are possible. They enable fabrication by MEMS technologies. Measurement of rotation rate about all three axes can be achieved with the two planar COG designs. Measurement of acceleration along all three axes can be achieved with two planar CPOGA designs. A full IMU can be carried out with separately assembled planar COGs and CPOGAs lying on the same plane. A full IMU can be fabricated simultaneously on the same wafer (or planar substrate).

This invention features a Coriolis Oscillating Gyroscopic (COG) instrument, comprising: a Double Ended Tuning Fork (DETF) having two stems and two tines; a Torque Summing Member (TSM) rigidly coupled to the DETF stems; means located at least partially on the TSM for vibrating the tines sinusoidally in opposition along a first axis, the tines' motion having a constant amplitude, a frequency and a phase; a case; a plurality of flexures connecting the TSM to the case, to allow the TSM and the DETF to rotationally oscillate together relative to the case about a second axis transverse to the first axis; and means for resolving rotation of the TSM relative to the case.

The flexures may be co-linear along the second axis that serves as the gyroscopic input and output axes. The TSM may be mass imbalanced about the second axis, so that the TSM experiences a pendulous torque when accelerated along a third axis transverse to both the first and second axes, causing the TSM and the DETF to rotate together about the second axis. The instrument may further include means for rotationally sinusoidally oscillating the TSM and the DETF together about the second axis, the oscillation having a constant amplitude, a phase, and a frequency the same as the tines' vibrational frequency. The instrument may still further include means for resolving the phase difference between the tines' vibration along the first axis and the TSM rotational oscillation about the second axis. The instrument may also include means for altering the phase relationship between the tines' motion and the TSM and DETF oscillation, to generate a gyroscopic torque that balances the pendulous torque. The instrument may still further include means, responsive to the means for resolving the phase difference, for determining the instrument acceleration along the third axis. The first and second axes may be orthogonal.

In this embodiment, the instrument may further include means, responsive to the means for resolving rotation, for determining the TSM oscillation amplitude. The instrument may still further include means, responsive to the means for determining the TSM oscillation amplitude, for determining the rate of rotation of the instrument about the input axis.

The flexures may be spaced circumferentially about the TSM in a common plane, and allow the TSM and the DETF to together rotationally oscillate in the plane about the second axis that serves as the gyroscopic input and output axes. In this embodiment, the instrument may have a third, acceleration input axis, and the TSM is mass imbalanced about the second axis, so that the TSM experiences a pendulous torque when accelerated along the third axis, causing the TSM and the DETF to rotate together about the second axis. This instrument may further include means, responsive to the means for resolving, for rotationally sinusoidally oscillating the TSM and the DETF together about the second axis, the oscillation having a constant amplitude, a phase, and a frequency the same as the tines' vibrational frequency. This instrument may still further include means for resolving the phase difference between the tines' vibration along the first axis and the TSM rotational oscillation about the second axis. This instrument may also include means for altering the phase relationship between the tines' motion and the TSM and DETF oscillation, to generate a gyroscopic torque that balances the pendulous torque. This instrument may further include means, responsive to the means for resolving the phase difference, for determining the instrument acceleration along the third axis. The first and second axes may be orthogonal.

This embodiment may further include means, responsive to the means for resolving rotation, for determining the TSM oscillation amplitude. The embodiment may further include means, responsive to the means for determining the TSM oscillation amplitude, for determining the rate of rotation of the instrument about the input axis. The first and second axes may be mutually orthogonal.

The means for resolving rotation of the TSM relative to the case may be at least partially located on the case. The means for rotationally sinusoidally oscillating the TSM and the DETF together may be at least partially located on the case. The means for rotationally sinusoidally oscillating the TSM and the DETF together may be at least partially located on the case. The tines may comprise parallel plates. The DETF, the TSM and the flexures may be located in the same plane to define an essentially planar instrument. The TSM may be essentially cylindrical to define a three dimensional instrument.

In another embodiment, this invention features a Coriolis Oscillating Gyroscopic instrument, comprising: a Double Ended Tuning Fork (DETF) having two stems and two tines; means for vibrating the tines sinusoidally in opposition along a first axis, the tines' motion having a constant amplitude, a frequency and a phase; a case; flexures connecting the DETF to the case and spaced circumferentially about the DETF in a common plane, to allow the DETF to rotationally oscillate in the plane about a second axis that serves as the gyroscopic input and output axis, and that is orthogonal to the first axis; and means for resolving rotation of the DETF about the second axis.

In this embodiment, the instrument may further include means, responsive to the means for resolving rotation, for determining the DETF oscillation amplitude. This instrument may still further include means, responsive to the means for determining the DETF oscillation amplitude, for determining the rate of rotation of the instrument about the input axis.

In another embodiment, this invention features an essentially planar inertial measurement unit for measuring motion in six degrees of freedom, comprising: three planar gyroscopes, each for measuring rotations about one of three mutually orthogonal axes; and three planar accelerometers, each for measuring acceleration along one of the three mutually orthogonal axes.

In yet another embodiment, this invention features a Coriolis Oscillating Gyroscopic instrument, comprising: a Double Ended Tuning Fork (DETF) having two stems and two tines; means for vibrating the tines sinusoidally in opposition along a first axis, the tines' motion having a constant amplitude, a frequency and a phase; a case; a plurality of flexures connecting the DETF to the case, to allow the DETF to rotationally oscillate relative to the case about a second axis transverse to the first axis; wherein the DETF is mass imbalanced about the second axis, so that the DETF experiences a pendulous torque when accelerated along a third axis, causing the DETF to rotate about the second axis; means for rotationally sinusoidally oscillating the DETF about the second axis, the oscillation having a constant amplitude, a phase, and a frequency the same as the tines' vibrational frequency; means for resolving rotation of the DETF relative to the case; means for resolving the phase difference between the tines' vibration along the first axis and the DETF rotational oscillation about the second axis; means for altering the phase relationship between the tines' motion and the DETF oscillation, to generate a gyroscopic torque that balances the pendulous torque; and means, responsive to the means for resolving the phase difference, for determining the instrument acceleration along the third axis.

Another embodiment features a stacked Coriolis Oscillating Gyroscopic instrument, comprising: a plurality of stacked, planar Coriolis Oscillating Gyroscopic instruments, each one comprising: a Double Ended Tuning Fork (DETF) having two stems and two tines; a Torque Summing Member (TSM) rigidly coupled to the DETF stems; a case; and a plurality of flexures connecting the TSM to the case, wherein the flexures are spaced circumferentially about the TSM in a common plane, and allow the TSM and the DETF to together rotationally oscillate in the plane about the second axis that serves as the gyroscopic input and output axes; wherein the cases are mechanically coupled, and the TSMs are mechanically coupled, to create a unitary stacked design; means located at least partially on each TSM for vibrating all of the tines sinusoidally in opposition, each vibrating along a first axis, the tines' motions all having the same frequency and phase; and means for resolving rotation of each TSM relative to its respective case. This instrument may further include means for rotationally sinusoidally oscillating each TSM and DETF together about the second axis.

BRIEF DESCRIPTION OF DRAWINGS

Other objects, features and advantages will occur to those skilled in the art from the following descriptions of the preferred embodiments, and the accompanying drawings, in which.

DESCRIPTION OF THE PREFERRED EMBODIMENTS

Coriolis Oscillating Gyro -1

Figure 1A:
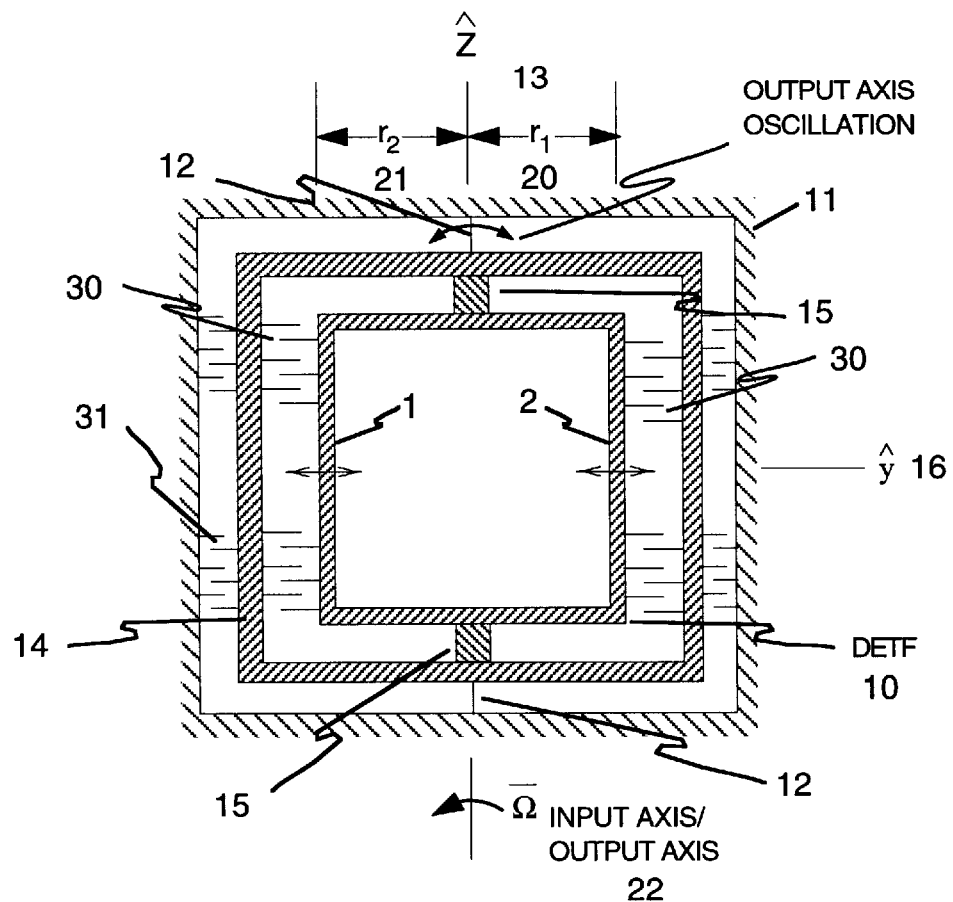
FIG. 1a is a highly schematic drawing of the Coriolis Oscillating Gyro, Type-1, (COG-1) of this invention in a planar embodiment.

The COG-1 gyro is described with the aid of FIG. 1. The rotor consists of a double ended tuning fork (DETF) 10 having two tines 1,2 (oscillating masses). The tuning fork is attached by rigid structures 15 to a gimbal 14 (TSM) which is attached by torsional flexures 12 to the case 11. The flexures allow rotational motion of the tuning fork and gimbal assembly in and out of the plane about the z-axis 13.

The tines constitute the moving masses moving in opposition along a common straight line, along the y-axis 16. The motion of the tines is driven sinusoidally by the tine drives 30 with frequency $\omega$ and displacements $\bar{l}_1 = \tilde{l} \sin \omega t$ and $\bar{l}_2 = \tilde{l}_2 \sin \omega t$. The velocities are given by $\bar{v}_1 = \tilde{v}_1 \cos \omega t = \omega \tilde{l}_1 \cos \omega t$ and $\bar{v}_2 = \tilde{v}_2 \cos \omega t = \omega \tilde{l}_2 \cos \omega t$.

Figure 2:
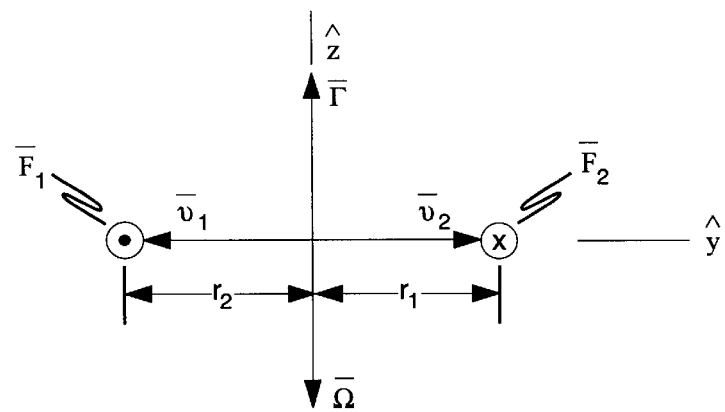
FIG. 2 is a vector diagram showing forces acting in a double-ended tuning fork gyro.

As tine 1 moves to the left with velocity, $v_1$, and tine 2 to the right with velocity, $v_2$, while the case is undergoing an input rotation, $\Omega$, about the z-axis (input axis 22), the tines experience Coriolis Forces given by $\bar{F}_1 = m\bar{v}_1 \times \Omega$ and $\bar{F}_2 = m\bar{v}_2 \times \Omega$ where m is the effective mass of each tine. FIG. 2 illustrates the vector diagram which applies. Note the direction of the forces. $F_2$ is into the page (circle with x indicating tail of arrow) and $F_1$ is out of the page (circle with dot indicating point of arrow). The combined action of the two forces acting at distances $r_1$ 20 and $r_2$ 21 from the flexure axis 13 generate a gyroscopic torque on the tuning fork to cause it to rotate with the gimbal about the flexure axis (output axis 22). Note that the output and input axes are the same. The torque amplitude is given by $\bar{\Gamma}_{gyro} = \bar{F}_1 \times \bar{r}_1 + \bar{F}_2 \times \bar{r}_2 = 2Fr\hat{z}$ which is further reduced to $\bar{\Gamma}_{gyro} = 2 \, mv\Omega r\hat{z}$ and $\bar{\Gamma}_{gyro} = 2 \, m\omega \tilde{l}\Omega r\hat{z} \cos \omega t$, assuming that the masses and velocities of the tines are equal and the rotation axis of the case is orthogonal to the direction in which the tines move.

With reversal of the direction of motion of the tines, the directions of the forces reverse and the torque acting on the tines causes a rotation of the tuning fork with gimbal in the opposite direction. As the tines oscillate back and forth, the tuning fork and gimbal assembly oscillates angularly about the flexure axis. The output motion is measured by the TSM pick-off 31.

The equation of motion for the tuning fork about the flexure axis is given by $$I_T|\$]\$\ddot{g}\ddot{v} + D_T\dot{\theta} + K_T\theta = 2\,m\omega\tilde{l}r(\cos \omega t)\Omega_z$$

where $I_T$ is the inertia about the flexure axis for the gimbal and tuning fork assembly, $D_T$ is the damping of the gimbal and tuning fork assembly and $K_T$ is the flexure stiffness. The tuning fork and gimbal assembly motion is then given as $\theta = \tilde{\theta} \sin(\omega t + \epsilon)$ where $\tilde{\theta}$ is the output amplitude which is related to the rotation input rate by $$\tilde{\vartheta} = \frac{2mr\omega\tilde{l}}{[D_T^2\omega^2 + I_T^2(\omega^2 - \omega_T^2)]^{\frac{1}{2}}} \Omega_z$$

The phase of the output signal is given by $$\varepsilon = \tan^{-1}\left[\frac{D_T\omega}{I_T(\omega_T^2 - \omega^2)}\right]$$

where $\omega_T$ is the resonance frequency of the gimbal and tuning fork assembly. The rotor tine amplitude, $\tilde{l}$ needs to be held constant. The mode of operation depends on the frequency of oscillation selected. For low power operation $\omega = \omega_R$, is the resonance frequency of the tines.

COG-1B

Figure 1B:
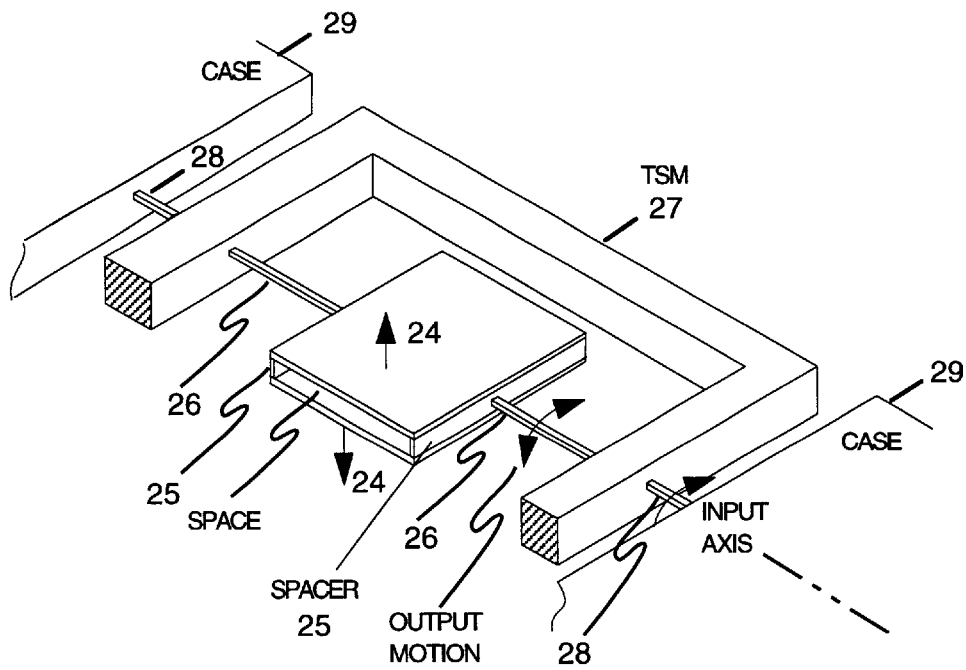
FIG. 1b is a highly schematic drawing of the COG, Type-1, with the tines in plate form.

A variation of the COG-1 is possible if the tines are in the form of plates. FIG. 1b shows the tines 24 being held apart and supported by spacers 25. The spacers are attached by rigid members 26 to a TSM gimbal 27. The TSM flexures 28 are attached to the case 29.

COG-2 Embodiment, Configuration 2

Figure 3:
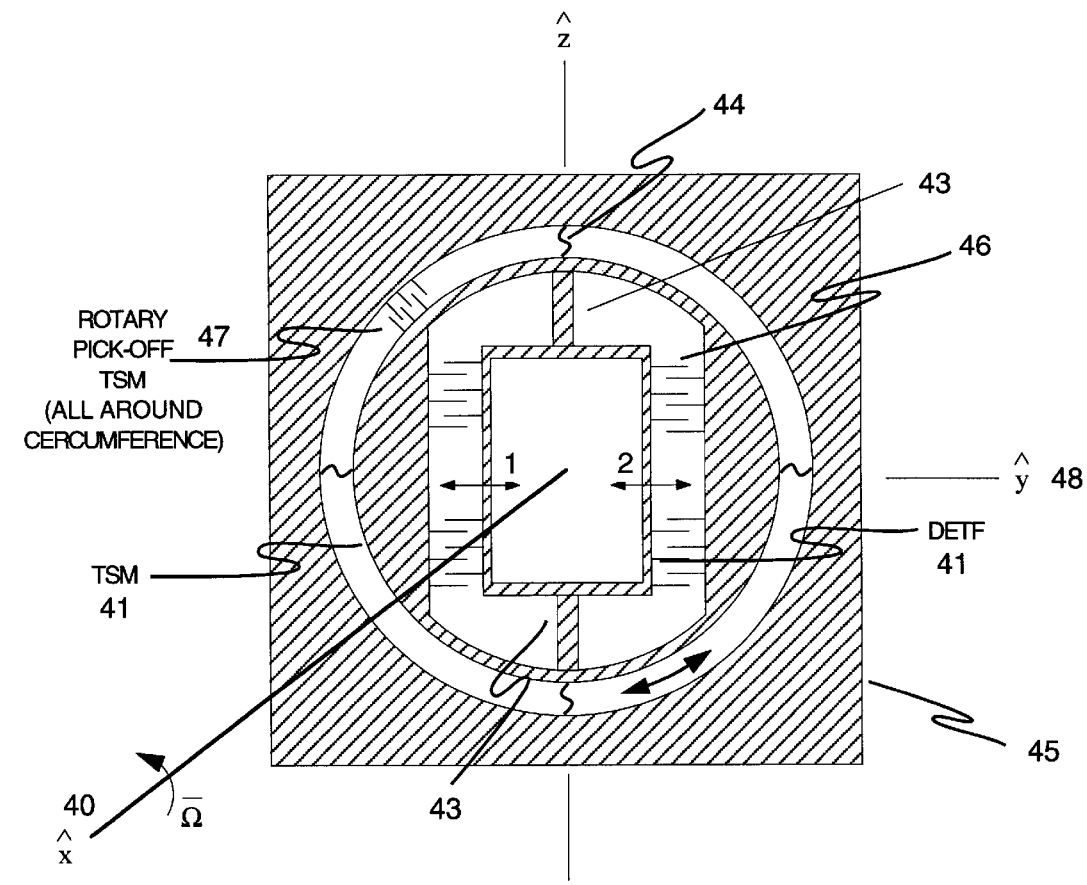
FIG. 3 is a highly schematic drawing of the Coriolis Oscillating Gyro, Type-2, (COG-2) of this invention in a planar embodiment.

A configuration is necessary for sensing input rates about the axis normal to the plane of the device, the x-axis 40 (FIG. 3). This permits 3-axes sensing to be realized with 3 devices fabricated in the same plane, when combined with Configuration 1 devices. The double-ended tuning fork 41 is used with the same tine motions as above. The tuning fork is rigidly mounted to a TSM 42 structure by rigid structures 43. The TSM structure is capable of rotary oscillations in the plane subject to flexure restraint torques. Radial flexures 44 are used for the TSM motion. The tines 1,2 are driven relative to the TSM and the TSM motion is sensed relative to the Case 45.

An advantage of this gyro configuration is that both the tine and TSM motions are in the plane and can therefore have similar Q values.

The alternative configuration would be to do without the TSM and allow the tuning fork itself to rotate in the plane.

The output axis 40 for the gyro is the same as the input axis. The tine drives 46 are shown acting between the TSM and tines. The drives are only indicative. They can be distributed to act along the full length of both tines. The rotary pick-off 47 senses the TSM motion. The pick-off is indicative and can be distributed along the full circumference to increase the signal level. The Y-axis 48 is the direction of linear oscillation of the tines.

COG-2B

This case corresponds to COG-2 where tines are replaced by oscillating plates. The COG-2b corresponds to an extrusion of the FIG. 3*a* design along the normal to the plane. The design can be achieved alternately to extrusion by stacking the FIG. 3 design repeatedly.

Operation of COG Gyro

Figure 4:
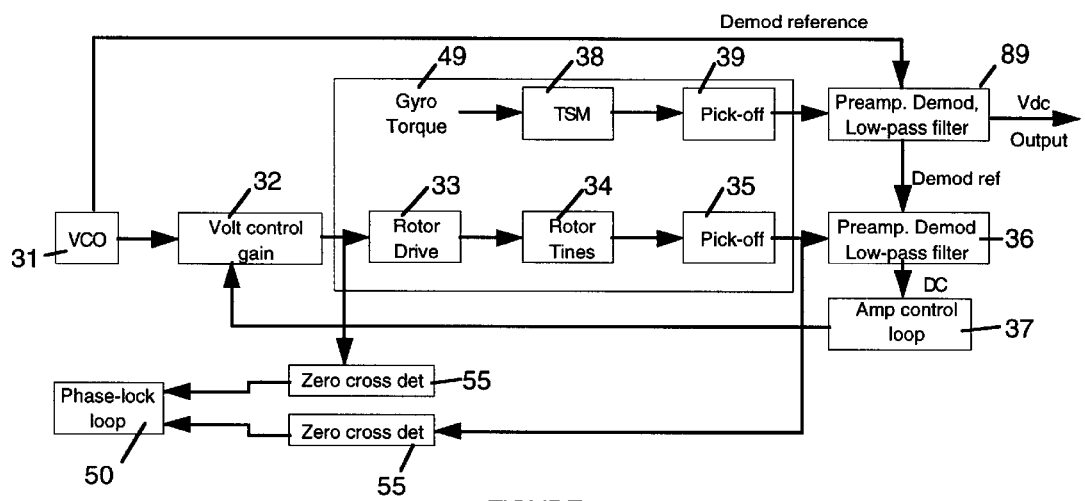
FIG. 4 is a schematic functional diagram of the COG gyro.

The operation of the COG gyros can be explained with the functional schematic of FIG. 4. A voltage controlled oscillator, VCO 31, provides the operational frequency at which the tines are driven. The Voltage Controlled Gain 32 sets the amplitude of the oscillation. The voltage is applied to the capacitive comb Rotor drive 33 to oscillate the Rotor tines 34. A pick-off 35 measures the tine motion that is sinusoidal. The signal is passed through a demodulator 36 and low pass filtered providing a DC voltage that is used in the amplitude control loop 37 to hold the rotor amplitude constant by adjusting the voltage control gain. For low power operation, the rotor tines are operated at resonance. For this to happen, the rotor is phase-locked to the VCO using drive signals from the rotor drive and signals from the rotor pickoff. The signals are passed through zero crossing detectors 55 and the separate times passed to the phase-lock loop 50. The output of the phase-lock loop controls the VCO frequency.

In the presence of input rotation rate of the case 49 about the TSM axis, a gyro torque is developed which drives the TSM 38 into oscillation. The oscillation is sensed by pick-off 39. The TSM signal is passed through the demodulator 89 from which a DC signal proportional to input rotation rate is obtained.

Theory of C-POGA Operation

CPOGA-1 Accelerometer, Configuration 1

Figure 5:
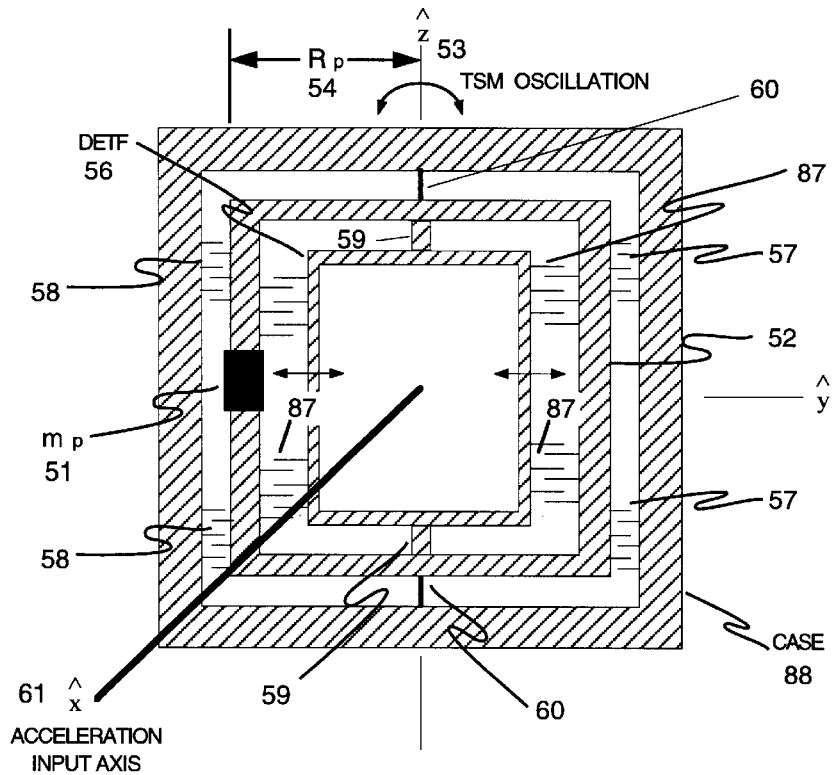
FIG. 5 is a highly schematic drawing of the Coriolis Oscillating Gyro Accelerometer, Type-1, (CPOGA-1) of this invention in a planar embodiment.

A pendulous mass 51 is added to the TSM 52 of the COG-1 gyro as shown in FIG. 5. Due to acceleration normal to the plane and along the x-axis 61, the TSM experiences a pendulous torque which acts to rotate the TSM about the z-axis 53 as allowed by the TSM flexures 60. The rigid structures 59 force the DETF 56 to turn also. The rotation is sensed by the TSM pick-off 58. The pendulous torque is given by $$\bar{\Gamma}_{pendulum} = m_p R_p a \hat{z}$$

where $m_p$ is the pendulous mass and $R_p$ 54 is the distance from the TSM flexure axis to the pendulous mass.

A DC gyro torque (non-zero, time-averaged) is required to balance the pendulous torque and it can be generated by applying an oscillatory motion of the TSM about the z-axis by operating the TSM drive 57. The rotor tines are driven by the tine drives 87. The gyro torque is given by $$\bar{\Gamma}_{gyro} = 2m\omega l \Omega r \hat{z} \cos \omega t$$

where $\Omega = \dot{\gamma}_z = \omega \gamma_z \cos(\omega t + \delta)$ is the servo driven motion of the TSM. The time average of the deflection of the TSM relative to the case 88 is given by $$\theta_{TSM} = \frac{\Gamma_{gyro} - \Gamma_{pendulum}}{K}$$

With the addition of a suitable control loop to control the TSM time averaged deflection at null, or $\theta_{TSM}=0$, the two torques are equal, resulting in an expression for acceleration very similar to the POGA $$a = \frac{m r \omega^2 l \tilde{\gamma}}{m_p R_p} \cos \delta$$

where $\delta$ is the phase difference between the motion of the oscillating tines and the motion of the oscillating TSM. And like the POGA, the phase $\delta$ is varied with acceleration to hold the TSM time averaged rotation at null.

Figure 6:
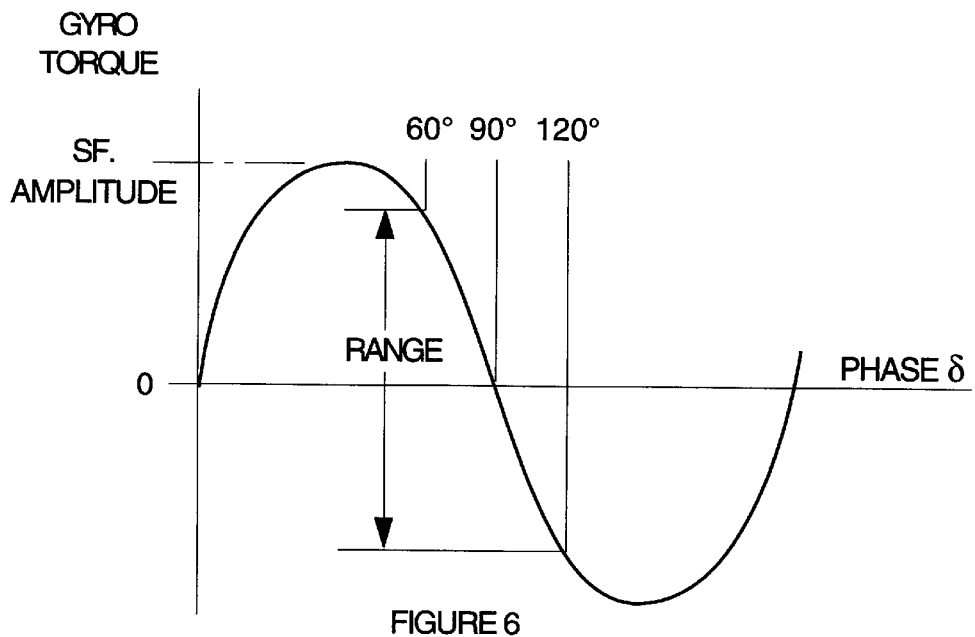
FIG. 6 is the illustration of the cosine dependence of the scale factor.

The scale factor is cosinusoidal as shown in FIG. 6 with the amplitude equal to the scale factor amplitude $$SF = \frac{m r \omega^2 l \tilde{\gamma}}{m_p R_p}.$$

A practical operation region can be selected to be from $\delta=60°$ to $\delta=120°$. At $90°$, there is no gyro torque applied. With decreasing phase, increased positive torque is applied to the TSM and with increasing phase, decreased torque is applied. The range of operation is selected by the separate factors in the scale factor.

CPOGA-2 Accelerometer

Figure 7:
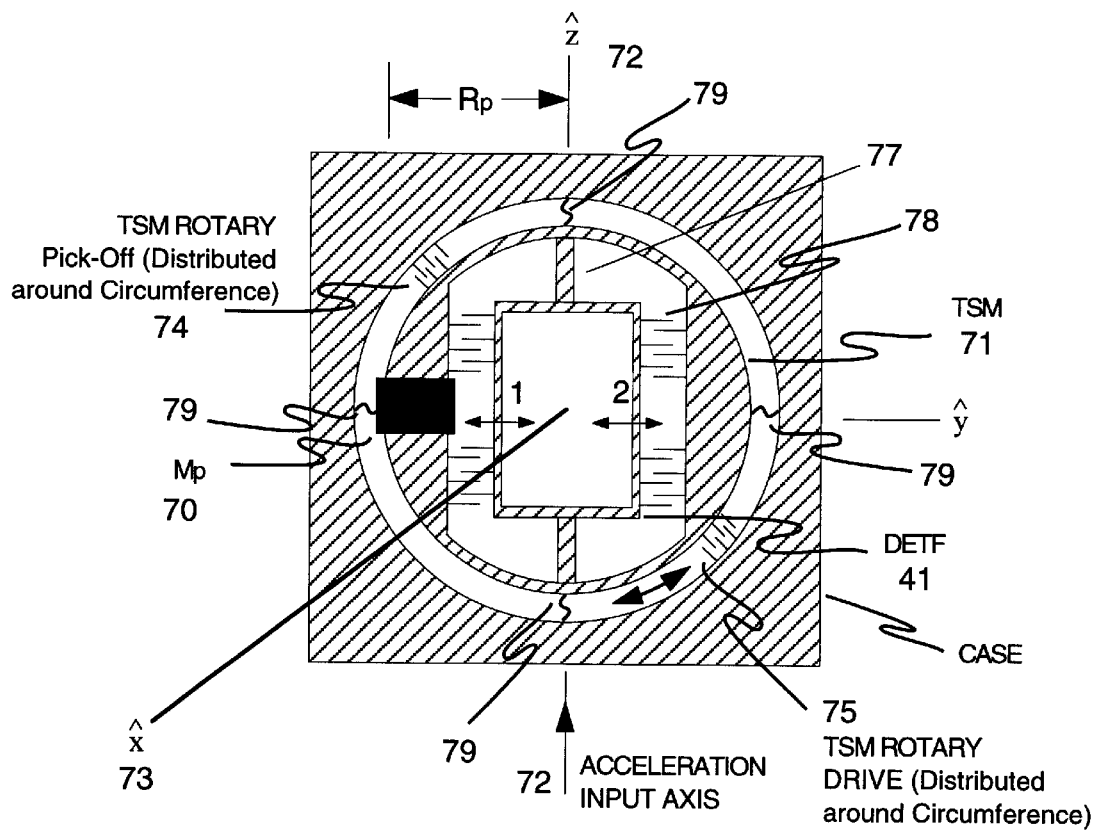
FIG. 7 is a highly schematic drawing of the Coriolis Oscillating Gyro Accelerometer, Type-2, (CPOGA-2) of this invention in a planar embodiment.

FIG. 7 shows a pendulous mass 70 added to the TSM 71 of the COG-2 gyro. Due to acceleration along the z-axis 72 for this particular arrangement, the TSM experiences a pendulous torque which acts to rotate the TSM about the x-axis 73 as allowed by the TSM flexures 79. The rotation of the TSM also rotates the DEFT 76 because of the rigid structures 77 which connect the DETF to the TSM. The TSM rotation is measured by the TSM pick-off 74. An applied oscillation of the TSM about the x-axis provided by the TSM drive 75 torques the TSM time averaged rotation back to null as discussed in the last section. The tines 1,2 are driven by tine drives 78. The TSM pick-off can be spread circumferentially to increase the rotary signal. The TSM drive can be spread circumferentially around the TSM structure.

Description of CPOGA Operation

Figure 8:
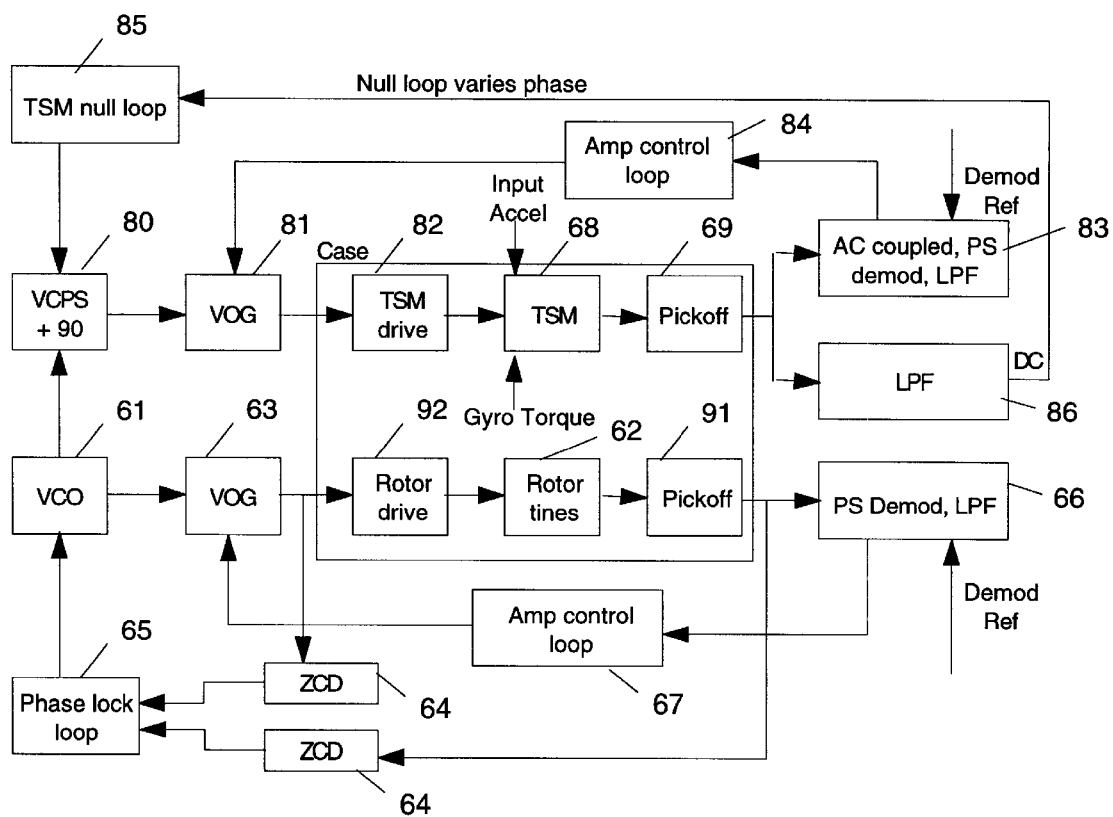
FIG. 8 is a schematic functional diagram of the CPOGA accelerometer.

FIG. 8 is a schematic description of the CPOGA functionality. A Voltage Controlled Oscillator, VCO 61, provides the oscillation frequency at which the rotor tines 62 oscillate. The Voltage Controlled Gain 63 (VCG) is applied to the rotor drive 92 which sets the amplitude of the rotor tines oscillation. The rotor pickoff 91 measures the rotor motion. The rotor drive and rotor pickoff signals are passed through zero crossing detectors and their output fed to a phase lock loop 65 which maintains the rotor tines at resonance. The rotor signal is passed through a demodulator 66 and the resulting DC voltage applied to the rotor amplitude control loop 67. Its output varies the gain of the VCG to maintain the rotor amplitude constant.

The VCO frequency is phased shifted by 90 degrees and applied to the Voltage Controlled Phase Shifter, VCPS 80. The oscillation is then amplified by the VCG 81, and applied to the TSM drive 82 which oscillates the TSM 68 at the same frequency as the RDM but at 90 degrees difference corresponding to zero acceleration. The amplitude of the TSM depends on the requirements of the scale factor amplitude.

The TSM pickoff 69 measures the TSM motion. The TSM signals are split into two branches. The first signal branch is AC coupled to remove the DC content and passed through the demodulator 83. The resulting DC output is applied to the TSM amplitude control loop 84. Its output varies the gain of the VCG 81 to maintain the TSM oscillation amplitude constant. The second signal branch is passed through a low pass filter 86. The output is indicative of TSM deflection rotation.

Input acceleration torques the TSM gimbal 68 to rotate. The TSM pickoff 69 senses the motion. The second branch of the signal generates a DC voltage which is fed to the TSM null loop 85 which varies the phase of the TSM oscillation. At null the phase difference is related to input acceleration.

3D CPOGA

Figure 9:
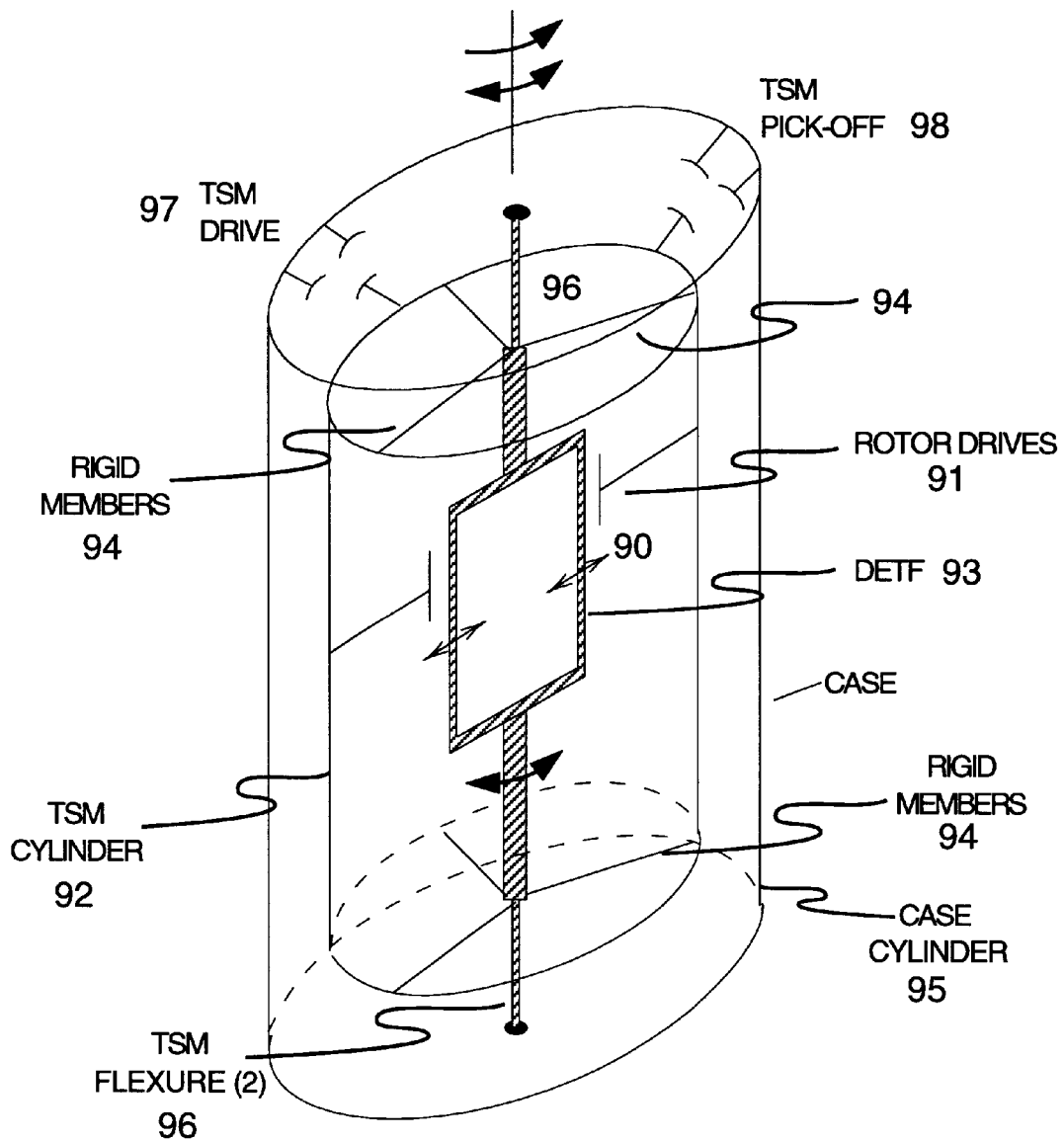
FIG. 9 is a highly schematic functional diagram of the CPOGA three dimensional concept.

Other than the planar forms described so far, the CPOGA can be constructed using circles of revolution. FIG. 9 is a schematic of one concept. The rotor tines 90 are driven by the rotor drive 91 relative to the TSM cylinder 92. The DETF 93 is rigidly attached to the TSM cylinder by rigid members 94. The TSM cylinder is suspended from the case cylinder 95 by the TSM flexures 96. The TSM cylinder rotates about the same axis as the case cylinder. A TSM drive 97 oscillates the TSM cylinder and the motion sensed by the TSM pickoff 98. The TSM drive and TSM pick-off can be distributed along the walls of the TSM and case cylinders.

Actuators

Actuators are used to drive the RDM of the gyro or the RDM and the TSM for the accelerometer in sinusoidal oscillations. Capacitive or electromagnetic components may be used. Such actuators are well known in the field. In planar designs capacitive comb drives may be used.

Pick-offs

Pick-offs are sensors that detect the motions of the RDM and TSM. Capacitive, electromagnetic or optical components may be used. Such components are well known in the field. In planar designs capacitive comb pick-offs may be used.

Amplitude and Frequency Feedback Options

In addition to phase as the feedback variable for changing the gyro torque, frequency and amplitude or any combination of the three variables, phase, frequency and amplitudes of the oscillations can be changed to vary the gyro torque.

Stacking Option

Figure 10:
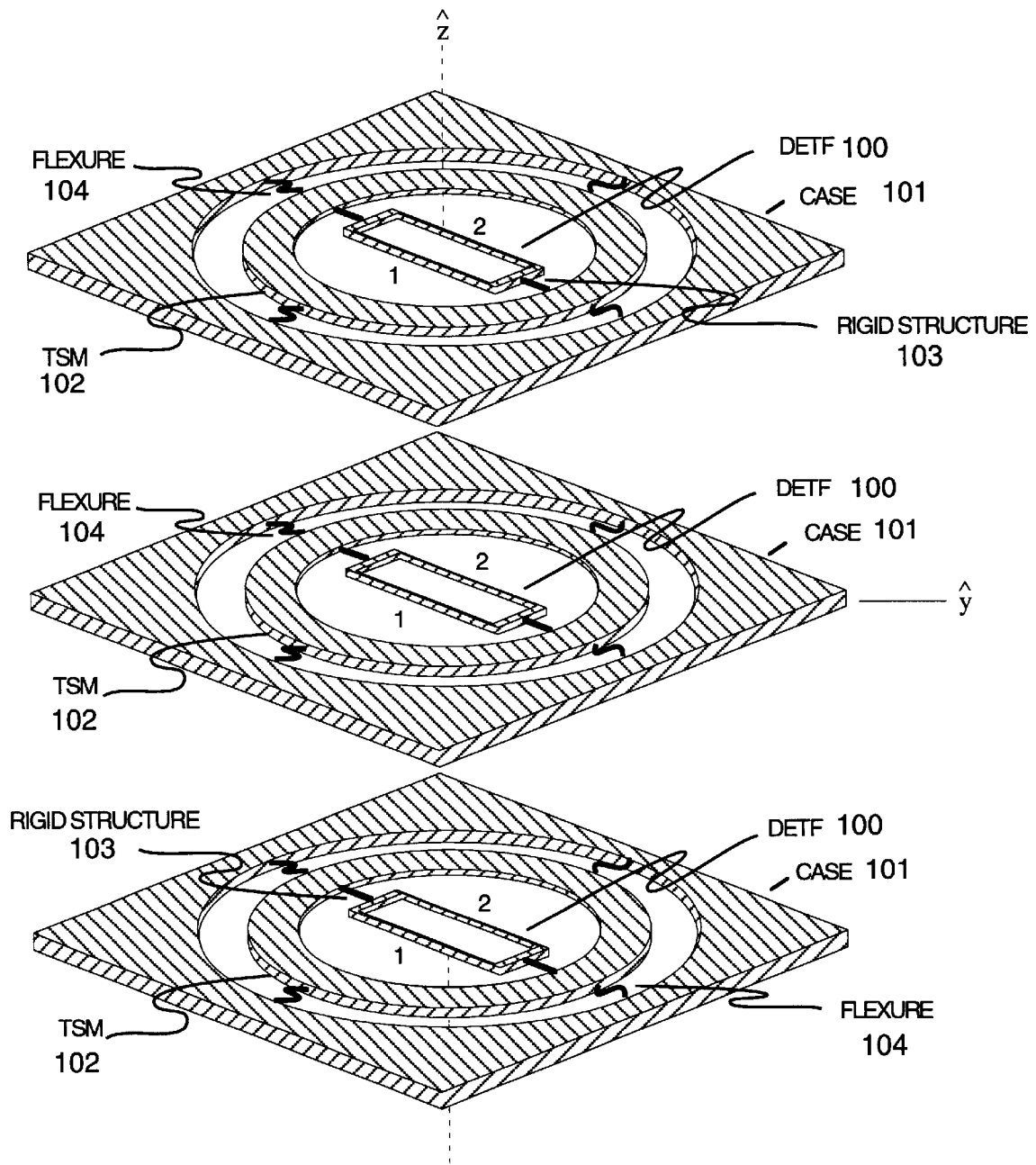
FIG. 10 is a highly schematic diagram of a stacked design for the invention.

The planar designs of COG-2 and CPOGA-2 are unique in that they allow stacking of completed instruments. In FIG. 10 is shown a schematic, stick representation of the approach. Three COG planar gyros are shown placed above each other. The concept is not limited to three. All gyros are self contained and operate separately. They are designed to have the same dynamics. That is, the operating frequency, the rotor tine frequency and TSM natural frequency values are the same for each gyro. This means that the flexure stiffnesses for the TSM and the rotor tines are the same for each gyro and the tine masses and the TSM inertias are the same. In the description throughout the patent application, the TSM includes the full structure comprising the gimbal and DETF structure which rotates about the TSM flexure axis.

In the assembly, the rigid structures 103 are bonded to each other. The DETF 100 are left unbonded. The DETF are to be driven so they are synchronized (in frequency and in phase)-they are to be locked to each other. The TSM 102 structures are bonded to each other. The cases 101 are bonded to each other. The TSM flexures 104 are not bonded to each other. The overall dynamics remains the same since the increase in stiffness from the flexures is offset by the increase in TSM inertia. The electronics that drives one should be able to drive the full assembly with allowances for increased power and stronger signals. The sensors that detect the TSM motion are connected to operate as one.

For the CPOGA-2, the pendulosity mass is added as well as the TSM drive and the assembly proceeds in the same way as the COG-2.

The stacking description is consistent with forming the COG-2 and CPOGA-2 by extruding along the x-axis to obtain three dimensional designs as described in COG-2B above.

The reasons for stacking are to allow the increase in mechanical and electrical signal to noise. Stacking increases the mass for each moving element hence reducing the thermomechanical noise. Stacking increases the capability of the sensors which measure the motions of the members hence reducing the electrical noise.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A Coriolis Oscillating Gyroscopic instrument, comprising:
   a Double Ended Tuning Fork (DETF) having two stems and two tines;
   a Torque Summing Member (TSM) rigidly coupled to the DETF stems;
   means located at least partially on the TSM for vibrating the tines sinusoidally in opposition along a first axis, the tines' motion having a constant amplitude, a frequency and a phase;
   a case;
   a plurality of flexures connecting the TSM to the case, to allow the TSM and the DETF to rotationally oscillate together relative to the case about a second axis transverse to the first axis; and
   means for resolving rotation of the TSM relative to the case.

2. The instrument of claim 1 wherein the flexures are co-linear along the second axis that serves as the gyroscopic input and output axes.

3. The instrument of claim 2, wherein the TSM is mass imbalanced about the second axis, so that the TSM experiences a pendulous torque when accelerated along a third axis transverse to both the first and second axes, causing the TSM and the DETF to rotate together about the second axis.

4. The instrument of claim 3, further including means for rotationally sinusoidally oscillating the TSM and the DETF together about the second axis, the oscillation having a constant amplitude, a phase, and a frequency the same as the tines' vibrational frequency.

5. The instrument of claim 4, further including means for resolving the phase difference between the tines' vibration along the first axis and the TSM rotational oscillation about the second axis.

6. The instrument of claim 5, further including means for altering the phase relationship between the tines' motion and the TSM and DETF oscillation, to generate a gyroscopic torque that balances the pendulous torque.

7. The instrument of claim 5, further including means, responsive to the means for resolving the phase difference, for determining the instrument acceleration along the third axis.

8. The instrument of claim 7, wherein the first and second axes are orthogonal.

9. The instrument of claim 2, further including means, responsive to the means for resolving rotation, for determining the TSM oscillation amplitude.

10. The instrument of claim 9, further including means, responsive to the means for determining the TSM oscillation amplitude, for determining the rate of rotation of the instrument about the input axis.

11. The instrument of claim 2 wherein the first and second axes are mutually orthogonal.

12. The instrument of claim 1, wherein the flexures are spaced circumferentially about the TSM in a common plane, and allow the TSM and the DETF to together rotationally oscillate in the plane about the second axis that is normal to the plane and that serves as the gyroscopic input and output axes.

13. The instrument of claim 12, wherein the instrument has an acceleration input axis in the plane, and the TSM is mass imbalanced about the second axis, so that the TSM experiences pendulous torque when accelerated along the acceleration input axis, causing the TSM and the DETF to rotate together about the second axis.

14. The instrument of claim 13, further including means, responsive to the means for resolving, for rotationally sinusoidally oscillating the TSM and the DETF together about the second axis, the oscillation having a constant amplitude, a phase, and a frequency the same as the tines' vibrational frequency.

15. The instrument of claim 14, further including means for resolving the phase difference between the tines' vibration along the first axis and the TSM rotational oscillation about the second axis.

16. The instrument of claim 15, further including means for altering the phase relationship between the tines' motion and the TSM and DETF oscillation, to generate a gyroscopic torque that balances the pendulous torque.

17. The instrument of claim 15, further including means, responsive to the means for resolving the phase difference, for determining the instrument acceleration along the acceleration input axis.

18. The instrument of claim 16, wherein the first and second axes are orthogonal.

19. The instrument of claim 12, further including means, responsive to the means for resolving rotation, for determining the TSM oscillation amplitude.

20. The instrument of claim 19, further including means, responsive to the means for determining the TSM oscillation amplitude, for determining the rate of rotation of the instrument about the input axis.

21. The instrument of claim 20 wherein the first and second axes are mutually orthogonal.

22. The instrument of claim 1 wherein the means for resolving rotation of the TSM relative to the case is at least partially located on the case.

23. The instrument of claim 4, wherein the means for rotationally sinusoidally oscillating the TSM and the DETF together is at least partially located on the case.

24. The instrument of claim 14, wherein the means for rotationally sinusoidally oscillating the TSM and the DETF together is at least partially located on the case.

25. The instrument of claim 1, wherein the tines comprise parallel plates.

26. The instrument of claim 1 wherein the DETF, the TSM and the flexures are located in the same plane to define an essentially planar instrument.

27. The instrument of claim 1, wherein the TSM is essentially cylindrical to define a three dimensional instrument.

28. A Coriolis Oscillating Gyroscopic instrument, comprising:
a Double Ended Tuning Fork (DETF) having two stems and two tines;
means for vibrating the tines sinusoidally in opposition along a first axis, the tines' motion having a constant amplitude, a frequency and a phase;
a case;
flexures connecting the DETF to the case and spaced circumferentially about the DETF in a common plane, to allow the DETF to rotationally oscillate in the plane about a second axis that serves as the gyroscopic input and output axis, and that is orthogonal to the first axis; and
means for resolving rotation of the DETF about the second axis.

29. The instrument of claim 28, further including means, responsive to the means for resolving rotation, for determining the DETF oscillation amplitude.

30. The instrument of claim 29, further including means, responsive to the means for determining the DETF oscillation amplitude, for determining the rate of rotation of the instrument about the input axis.

31. A Coriolis Oscillating Gyroscopic instrument, comprising:
a Double Ended Tuning Fork (DETF) having two stems and two tines;
means for vibrating the tines sinusoidally in opposition along a first axis, the tines' motion having a constant amplitude, a frequency and a phase;
a case;
a plurality of flexures connecting the DETT to the case, to allow the DETF to rotationally oscillate relative to the case about a second axis transverse to the first axis;
wherein the DETF is mass imbalanced about the second axis, so that the DETF experiences a pendulous torque when accelerated along a third axis, causing the DETF to rotate about the second axis;
means for rotationally sinusoidally oscillating the DETF about the second axis, the oscillation having a constant amplitude, a phase, and a frequency the same as the tines' vibrational frequency;
means for resolving rotation of the DETF relative to the case;
means for resolving the phase difference between the tines' vibration along the first axis and the DETF rotational oscillation about the second axis;
means for altering the phase relationship between the tines' motion and the DETF oscillation, to generate a gyroscopic torque that balances the pendulous torque; and
means, responsive to the means for resolving the phase difference, for determining the instrument acceleration along the third axis.

32. A stacked Coriolis Oscillating Gyroscopic instrument, comprising:
a plurality of stacked, planar Coriolis Oscillating Gyroscopic instruments, each one comprising:
a Double Ended Tuning Fork (DETF) having two stems and two tines;
a Torque Summing Member (TSM) rigidly coupled to the DETF stems;
a case; and
a plurality of flexures connecting the TSM to the case, wherein the flexures are spaced circumferentially about the TSM in a common plane, and allow the TSM and the DETF to together rotationally oscillate in the plane about the second axis that serves as the gyroscopic input and output axes;

wherein the cases are mechanically coupled, and the TSMs are mechanically coupled, to create a unitary stacked design;

means located at least partially on each TSM for vibrating all of the tines sinusoidally in opposition, each vibrating along a first axis, the tines' motions all having the same frequency and phase; and means for resolving rotation of each TSM relative to its respective case.

33. The instrument of claim 32, further including means for rotationally sinusoidally-oscillating each TSM and DETF together about the second axis.

34. An essentially planar inertial measurement unit for measuring motion in six degrees of freedom, comprising:

a) three planar gyroscopes, each for measuring rotations about one of three mutually orthogonal axes, each gyroscope comprising:
   a Double Ended Tuning Fork (DETF) having two stems and two tines;
   a Torque Summing Member (TSM) rigidly coupled to the DETF stems;
   means located at least partially on the TSM for vibrating the tines sinusoidally in opposition along a first axis, the tines' motion having a constant amplitude, a frequency, and a phase;
   a plurality of flexures connecting the DETF to the case, to allow the DETF to rotationally oscillate relative to the case about a second axis transverse to the first axis; and
   means for resolving oscillation of the TSM relative to the case; wherein for two of the gyroscopes the first and second axes are co-planar with the gyroscope, and for the third gyroscope the second axis is orthogonal to the gyroscope plane; and b) three planar accelerometers, each for measuring acceleration along one of the three mutually orthogonal axes, each accelerometer comprising:
   a Double Ended Tuning Fork (DETF) having two stems and two tines;
   a Torque Summing Member (TSM) rigidly coupled to the DETF stems;
   means located at least partially on the TSM for vibrating the tines sinusoidally in opposition along a first axis, the tines' motion having a constant amplitude, a frequency, and a phase;
   a case;
   a plurality of flexures connecting the TSM to the case, to allow the TSM and DETF to be rotationally oscillated relative to the case about a second axis transverse to the first axis;
   wherein the TSM is mass imbalanced about the second axis, so that it experiences a pendulous torque when accelerated along a third axis transverse to both the first and second axes, causing non-oscillatory rotation of the TSM and the DETF together about the second axis;
   means for driving the TSM in oscillation about the second axis at the same frequency as the tines' vibration, to generate gyroscopic torque that balances the pendulous torque; and
   means for determining, from the phase of the tines' vibration and the phase of the TSM oscillation, acceleration along the third axis;
wherein for one of the accelerometers the first and second axes are co-planar with the accelerometer, and for the other two accelerometers the second axis is orthogonal to the accelerometer plane.

* * * * *